Nov. 28, 1967 P. A. GLORIOSO 3,355,570
SAFETY CIRCUIT FOR DRAWN-ARC, STUD-WELDING APPARATUS
Filed July 17, 1963
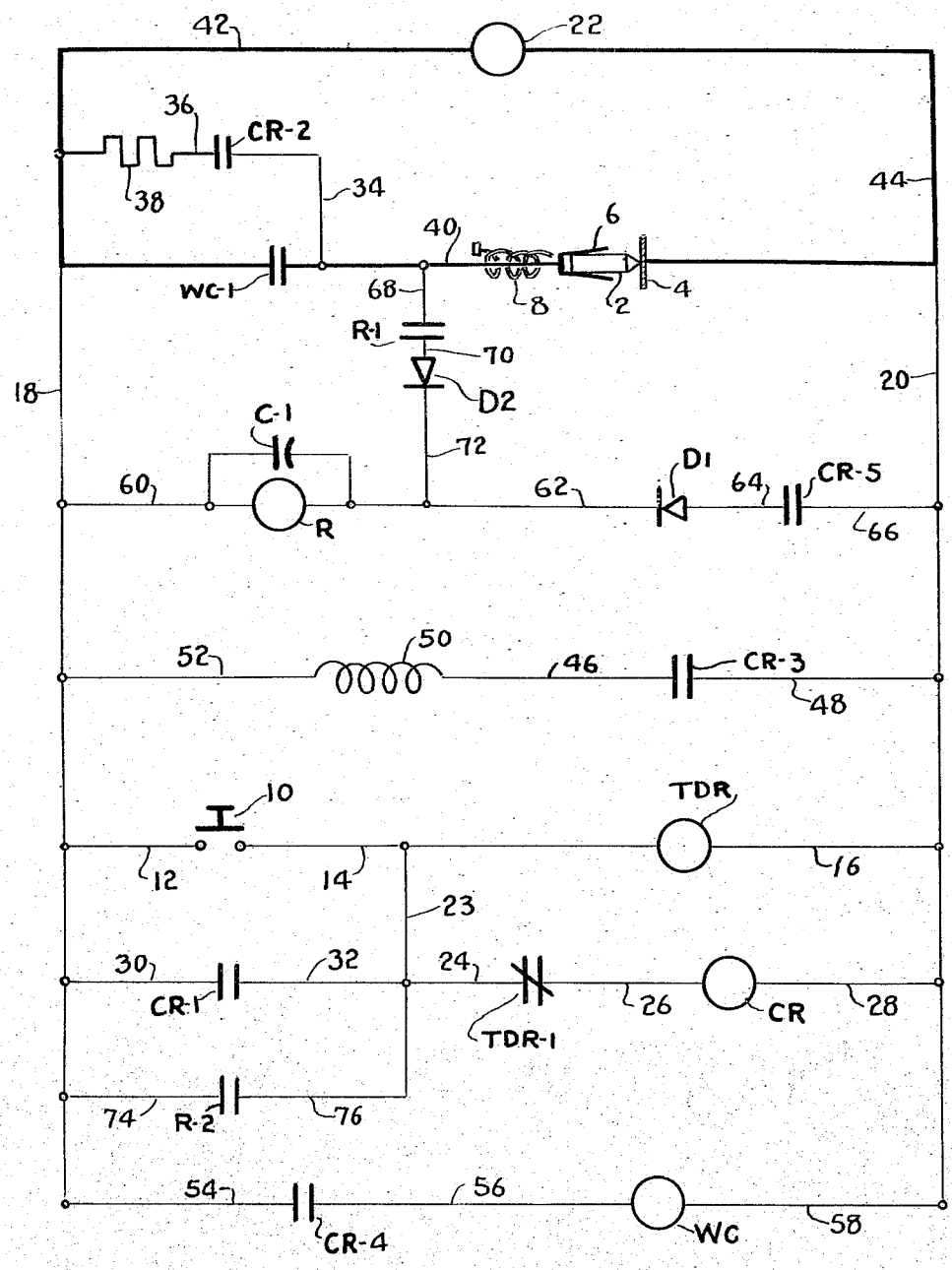
INVENTOR.
Paul A. Glorioso
BY
ATTORNEYS

United States Patent Office 3,355,570
Patented Nov. 28, 1967

3,355,570
SAFETY CIRCUIT FOR DRAWN-ARC, STUD-WELDING APPARATUS
Paul A. Glorioso, Amherst, Ohio, assignor to Gregory Industries, Inc., Lorain, Ohio, a corporation of Michigan
Filed July 17, 1963, Ser. No. 295,721
8 Claims. (Cl. 219—98)

ABSTRACT OF THE DISCLOSURE

An electrical circuit is provided to prevent accidental arcing between a welded stud and a chuck when the welding tool is withdrawn after a welding cycle. The electrical circuit separates the source of power from the chuck when the weld is completed and prevents power from being reapplied to the chuck even if the trigger is pulled again so that an arc cannot be struck as the chuck is withdrawn from the welded stud.

---

This invention relates to a safety circuit for welding apparatus and more particularly to a safety circuit for minimizing the chance of damage to a stud chuck constituting part of a stud welding apparatus.

The safety circuit is particularly designed for use with the type of arc welding in which metal studs are welded in on-end positions to a workpiece. In this type of welding, the stud is first held against the workpiece and is then retracted with an arc simultaneously struck between the stud and the workpiece. The stud is held in the retracted position for a short predetermined period of time during which the arc persists, and after this period the stud is plunged against the workpiece to weld the two together by molten metal formed by the arc on both the stud and the workpiece. The welds thereby produced are uniform and strong and can be completed very rapidly, even by workers having minimum skill.

With arc welding apparatus for producing welds as described above, it is not uncommon for an arc to be struck accidentally between a stud which has just been welded and the chuck which holds the stud during the welding operation, such an arc occurring as the chuck is removed from the stud. This may happen, for example, if the trigger is actuated to connect the chuck to the welding current just as the chuck is pulled off the welded stud. An arc is then drawn between the stud and the chuck with the result that the chuck is burned, often severely enough to be irreparable. The chucks usually are made of copper and are relatively expensive, particularly when made to a special design for a specific application, so that even an occasional accidental burning of a chuck can be quite costly.

The present invention relates to a circuit for use with arc welding apparatus, which circuit substantially prevents accidents of the type described above. The improved circuit removes power from the chuck when the weld is completed and prevents power from being reapplied to the chuck even if the trigger is pulled again. The latter condition is maintained until after the chuck is completely removed from the welded stud and for a short period of time thereafter.

It is, therefore, a principal object of the invention to provide a circuit for arc welding which prevents accidental burning of a stud chuck of welding apparatus incorporating the circuit.

Other objects and advantages of the invention will be apparent from the following detailed description of a preferred embodiment thereof, reference being made to the accompanying drawing, in which the single figure is a diagrammatic representation of an arc welding safety circuit embodying the invention.

Referring to the drawing, in a typical end welding operation, a stud 2 is to be end welded to a workpiece 4. The stud itself can be of any suitable design, a large number of which are well known in the art, and the invention is not to be limited to a stud of any particular design. The workpiece can also be of any suitable size and shape, depending upon the particular application. In end welding the stud to the workpiece, the stud is first held against the workpiece, as shown, and is then retracted with a pilot arc being struck substantially at the same time. Immediately thereafter, a welding arc is established across the pilot arc with the arc maintained while the stud is held in a retracted position, a predetermined distance away from the workpiece. After the predetermined period of time, the stud is automatically plunged against the workpiece with the welding arc preferably being maintained during the plunge stroke, until the stud contacts the workpiece, to assure that the small pools of molten metal which have been formed by the welding arc on both the end of the stud and on the workpiece remain molten until the two contact one another. These two minute pools of metal cool as the stud is forced against the workpiece to complete the weld. The entire welding operation usually consumes less than one or two seconds.

To achieve the above described operation, the stud 2 is first engaged in a chuck 6 of a welding tool, as is well known in the art, the engagement usually being a friction fit. The stud 2 is then pressed against the workpiece to compress a plunge spring 8 slightly. A trigger 10 on the welding tool is then actuated to close its contacts and to complete an electrical path between lines 12 and 14. A circuit is then established through the lines 12 and 14, a time delay relay TDR, and an additional line 16 to connect supply leads 18 and 20, which are connected to a suitable source of current such as a generator 22. When the time delay relay TDR is first actuated, it begins to time out with its contacts TDR-1 opening at the end of the timing cycle.

At the same time that the time delay relay is actuated, an electrical path is also completed through lines 23 and 24, the contacts TDR-1, a line 26, a control relay CR, and a line 28. When the control relay CR is actuated, it first closes its normally-open contacts CR-1 to connect lines 30 and 32 to establish a temporary holding circuit for the relay CR if the trigger 10 is released. The control relay CR also closes a set of normally-open contacts CR-2 to connect lines 34 and 36. This establishes a current path through a pilot arc choke indicated at 38, which choke can be in the form of an inductance or a resistance, and also connects the chuck 6 to the generator 22 through a heavy conductor 40, the lines 34 and 36, and another heavy conductor 42. At the same time, the workpiece 4 is connected to the generator 22 through a heavy conductor 44. This readies the stud and workpiece for a pilot arc when the stud is retracted.

At substantially the same time that the control relay CR closes its contacts CR-2, it also closes a set of normally-open contacts CR-3, to connect lines 46 and 48 and to establish a path through these lines, and a lifting coil 50, which is connected to power source line 18 by a lead 52. The lifting coil 50, when energized, retracts the chuck 6 and the stud 2, as is well known in the art. At the same time, the pilot arc is struck between the stud 2 and the workpiece 4 with the path for the pilot arc having been established through the contacts CR-2.

In furtherance of the welding operation, the control relay CR closes its normally-open contacts CR-4 to complete a circuit from power line 18 through lines 54 and 56, a welding contactor WC, and line 58 to the current source line 20. The welding contactor WC is essentially a heavy duty relay and contains normally-open, heavy duty contacts WC-1 which, when closed, connect the heavy conductors 40 and 42 to thereby establish a welding arc across the pilot arc between the stud 2 and the workpiece 4. The welding contactor is designed to operate relatively slowly compared to the operation of the control relay CR with the result that the welding contactor contacts WC–1 are not closed until the pilot arc is established and the stud is retracted.

The above condition remains, with the stud 2 held in the retracted position by the coil 50 and with the welding arc maintained between the end of the stud 2 and the workpiece 4 until the time delay relay TDR times out. At this time, its contacts TDR–1 connecting the lines 24 and 26 open to de-energize the control relay CR. The contacts TDR–1 then remain open at least until the trigger 10 is released. When the relay CR is de-energized, the control relay contacts CR–1 open to prevent the relay CR from being re-energized. At the same time, the contacts CR–2 are opened to disconnect the pilot arc circuit and the contacts CR–3 are opened to de-energize the lifting coil 50. At this time, the spring 8, which has been more fully compressed during the lift stroke, begins to plunge the stud 2 against the workpiece 4. The contacts CR–4 also are opened when the relay CR is disconnected to de-energize the welding contactor WC and to open the welding contacts WC–1 again, however, the welding contactor operates comparatively slowly so that the contacts WC–1 do not open until the plunge stroke of the stud 2 has begun, with the result that the welding arc is not actually extinguished until approximately the time that the stud 2 contacts the workpiece 4. Once the stud 2 contacts the workpiece 4, the stud is held against it by the spring 8 until the metal cools. The welding tool is then withdrawn to complete the welding operation.

As the chuck 6 is withdrawn from the stud 2, occasionally the trigger 10 will be accidentally pushed which ordinarily would again operate the control relay CR and the welding contactor WC with welding power connected to the chuck 6 during its withdrawal. Consequently, a heavy welding arc would be struck between the chuck 6 and the stud 2 which now is of the same polarity as the workpiece 4. A heavy welding arc will damage the chuck 6 and will usually render it irreparable. Besides being costly as discussed previously, this condition can also be dangerous should the operator's hand, for example, be in contact with the chuck and the stud at this time.

To prevent accidental burning of the chuck, the circuit of the invention includes safety features for preventing an arc from being accidentally struck between the chuck 6 and the stud 2. For this purpose, a safety relay R is located in the circuit between two lines 60 and 62 with the line 62 being connected through a diode D1 to a line 64. Normally-open contacts CR–5 of the control relay CR are interposed between the line 64 and a line 66 to control power for the relay R from the leads 18 and 20. When the control relay CR is actuated to initiate the welding operation, it also closes the normally-open contacts CR–5 to complete the path through the relay R and energize it. When this occurs, the relay R closes its normally-open contacts R–1 connecting lines 68 and 70, the latter being connected through a diode D–2 to a line 72. After the stud 2 is in contact with the workpiece 4 at the completion of the weld, this path holds the relay R in by completing a circuit from the lead 18 through the lines 60 and 62, the heavy conductor 40, the chuck 6, the stud 2, and workpiece 4, and the heavy conductor 44. The relay R is then held in even though the relay CR has been de-energized and the relay contacts CR–5 are open.

At the time that the contacts R–1 are closed, the safety relay R also closes its normally-open contacts R–2 to connect by-pass lines 74 and 76. The contacts R–2 then complete a circuit for the time delay relay TDR through the lines 16, 14, 23, 76, and 74 even though the trigger 10 should be opened. Hence, when the time delay relay has time out, its contacts TDR–1 will open and remain open at least until all circuits to the time delay relay TDR are broken and the time delay relay is de-energized. Thus, the control relay CR cannot be actuated and another weld cycle cannot be commenced as long as the contacts TDR–1 are open, which will be the case as long as the contacts R–2 are closed. The contacts R–2 will remain closed as long as the relay R is energized and the relay R will be energized as long as the chuck 6 is engaged with the stud 2. Therefore, it is impossible for weld current to be supplied to the chuck 6 and the stud 2 as long as they are in contact with one another.

Another welding cycle can be established only after the chuck 6 is removed from the stud 2. Only then will the circuit for the relay R through its contacts R–1 be broken and the contacts R–2 opened. Then the circuit for the time delay relay TDR is broken to de-energize the time delay relay TDR and enable it to be reset. After timing out, the contacts TDR–1 will remain open at least until the time delay relay is de-energized.

The safety relay R is energized, as previously noted, when the contacts CR–5 close and will remain activated until the contacts CR–5 open when the control relay CR is de-energized, at which time, the plunge stroke of the stud 2 is initiated. Although the electrical path for the relay R is then interrupted, a path is established an instant afterward when the stud 2 contacts the workpiece 4. During this short interruption, a capacitor C–1 across the relay R is discharged to hold in the relay. Thus, the relay R will remain activated from the time the relay contacts CR–5 first close until the chuck 6 is removed from the stud 2 to break the last circuit for the relay R. The capacitor C–1 also discharges when the chuck 6 is withdrawn from the stud 2 which holds the relay in for a brief period of time after separation of the chuck and stud. This is important because it prevents the possibility of the trigger 10 being pulled immediately after separation of the chuck 6 and the stud 2 which could again strike a heavy arc between the stud and chuck. With this delay, the chuck 6 must be brought back into engagement with the stud 2 and then withdrawn from it as the trigger 10 is pulled in order to strike an arc. It is substantially impossible for this to occur accidentally.

The diode D2 prevents a short circuit through the heavy conductor 42, the welding contactor contacts WC–1, the conductor 40, and the lines 68, 70, 72, 62, 64, and 66 when the stud is retracted, and the diode D1 similarly prevents such a short circuit in case the polarity happens to be reversed. The diode D1 also is used if a single set of contacts replaces the contacts CR–3 and CR–5. In such an instance, the diode D1 would prevent the completion of a circuit through the workpiece 4, the stud 2, the line 62, the line 64, the line 46, and the lifting coil 50.

To summarize the operation, when the trigger 10 is pulled to close its associated contacts, the time delay relay TDR is immediately actuated to begin timing out. The control relay CR is also actuated to close its contacts CR–1 to hold itself in, to close its contacts CR–2 to ready a pilot arc, and to close its contacts CR–3 to actuate the left coil 50 and retract the stud 2 from the workpiece 4. The relay CR also closes its contacts CR–4 to actuate the welding contactor WC which closes its contacts WC–1 and establishes a welding arc about the time the stud 2 has reached its retracted position. During this time, the time delay relay TDR has been timing and reaches the end of its predetermined period after the stud 2 has reached its retracted position and after the welding arc has been established. When the end of the period has been reached, the time delay relay TDR opens its relay contacts TDR–1 to drop out the relay CR. The lift coil 50 is then deactivated and the spring 8 commences the plunge stroke of the stud 2. At the same time, the welding contactor WC is deactivated and its contacts WC–1 open by the time the stud 2 contacts the workpiece 4 to extinguish the welding arc.

Ordinarily, the trigger 10 could be pulled again to initiate another welding cycle by initiating another timing period for the time delay relay TDR. However, the safety relay contacts R–2 are now closed to maintain the time delay relay TDR energized and prevent it from being reset to initiate another timing cycle.

The safety relay contacts R–2 are closed by the actuation of the safety relay R which occurs when the contacts CR–5 are closed when the control relay CR is energized. The safety relay R remains closed with the aid of the capacitor C–1 and the circuit established through the stud 2 and the workpiece 4 until the chuck 6 is withdrawn from the stud 2 to break the circuit for the safety relay R. Even then, the capacitor C–1 keeps in the relay R for a short period of time after separation of the stud and the chuck. Only then are the contacts R–2 opened with the circuit for the time delay relay TDR interrupted, so that this relay can be deenergized and reset so as to be ready to start another timing period when again energized by the closing of the trigger 10.

Numerous modifications of the above described embodiment of the invention will be apparent to those skilled in the art and it is to be clearly understood that such modifications can be made without departing from the scope and spirit of the invention, if they are within the tenor of the accompanying claims.

What I claim is:

1. In welding apparatus for end welding a stud to a workpiece comprising a chuck for engaging a stud, a supply circuit for connecting the chuck and workpiece to a source of power, a lifting coil for retracting the chuck from the workpiece, plunging means for moving the chuck toward the workpiece when the liftingcoil is de-energized a welding contactor, said contactor having normally open contacts in the supply circuit between the power source and the chuck, a control relay for energizing the lifting coil and for actuating the contactor to close its contacts whereby said chuck and the stud are retracted and an arc is struck between the stud and the workpiece, a time delay relay having contacts for controlling actuation of the control relay, said time delay relay contacts being closed when the time delay relay is energized and is timing, said time delay relay contacts de-energizing said control relay when open to de-energize the lifting coil and the weld contactor whereby the chuck and the stud are plunged toward the workpiece and the arc is extinguished, and a trigger for actuating the time delay relay, the improvement comprising a safety relay actuated by the control relay, said safety relay having normally open contacts for connecting the safety relay to the chuck for supplying current to the safety relay when the control relay is de-energized, the chuck is in contact with the stud, and the stud is in contact with the workpiece, said safety relay also having normally-open contacts by-passing the trigger to prevent resetting of the time delay relay when the trigger is released and the chuck is still in contact with the stud and the stud in contact with the workpiece.

2. In welding apparatus for end welding a stud to a workpiece comprising a chuck for engaging a stud, supply circuit means for connecting the chuck and workpiece to a source of power and for connecting the workpiece to a source of power, lifting means for retracting the chuck from the workpiece, plunging means for moving the chuck toward the workpiece, supply control means for opening and closing said circuit means between the power source and the chuck, a control relay for actuating the lifting means and for actuating the supply control means whereby said chuck and the stud are retracted and an arc is struck between the stud and the workpiece, a time delay relay having contacts for controlling actuation of the control relay, said time delay relay contacts being closed when the time delay relay is energized and is timing, said time delay relay contacts de-energizing said control relay when open to deactivate the lifting means and the supply control means whereby the chuck and the stud are plunged toward the workpiece and the arc is extinguished, and a trigger for actuating the time delay relay, the improvement comprising a safety relay actuated by the control relay, said safety relay having normally open contacts for connecting the safety relay to the chuck for supplying current to the safety relay when the control relay is de-energized, the chuck is in contact with the stud, and the stud is in contact with the workpiece, said safety relay also having normally-open contacts by-passing the trigger to prevent resetting of the time delay relay when the trigger is released and the chuck is still in contact with the stud and the stud in contact with the workpiece.

3. In welding apparatus for welding a stud to a workpiece comprising a chuck for engaging a stud, means for supplying welding current to said chuck and to the workpiece, lifting means for retracting the chuck from the workpiece, plunging means for moving the chuck toward the workpiece, a control relay for actuating the lifting means and the supply means whereby said chuck and the stud are retracted and an arc is struck between the stud and the workpiece, time delay means having contacts for controlling actuation of the control relay, said time delay contacts being closed when the time delay means is timing, said contacts de-energizing said control relay when open to deactivate the lifting means and the supply means whereby the chuck and the stud are plunged toward the workpiece and the arc is extinguished, and a trigger for actuating the time delay relay, the improvement comprising a safety relay actuated by the control relay, said safety relay having normally open contacts for connecting the safety relay to the chuck for supplying current to the safety relay when the control relay is de-energized, the chuck is in contact with the stud, and the stud is in contact with the workpiece, said safety relay also having normally-open contacts by-passing the trigger to prevent resetting of the time delay relay when the trigger is released and the chuck is still in contact with the stud and the stud in contact with the workpiece.

4. Welding apparatus for welding a stud to a workpiece comprising a chuck for engaging a stud, means for supplying welding current to said chuck and to the workpiece, lifting means for retracting the chuck from the workpiece, plunging means for moving the chuck toward the workpiece, control means for controlling the lifting means and the supply means to retract said chuck and the stud and to strike an arc between the stud and the workpiece when said control means is energized, time delay means for controlling, when set, the duration of energization of said control means to cause said chuck and the stud to plunge toward the workpiece and the arc to be extinguished after a predetermined period of time, a trigger for actuating the time delay means, a safety relay actuated when the chuck is engaged with the stud and the stud is welded to the workpiece, said safety relay having normally open contacts to prevent resetting of said time delay means and re-energization of said control means when the trigger is released and the chuck is still in contact with the stud and the stud is welded to the workpiece.

5. Welding apparatus for welding a stud to a workpiece comprising a chuck for engaging a stud, means for supplling welding current to said chuck and to the workpiece, lifting means for retracting the chuck from the workpiece, plunging means for moving the chuck toward the workpiece, control means for controlling the lifting means and the supply means to retract said chuck and the stud and to strike an arc between the stud and the workpiece when said control means is energized, time delay means for controlling, when set, the length of energization of said control means to cause said chuck and the stud to plunge toward the workpiece and the arc to be extinguished after a predetermined period of time, a trigger for actuating the time delay means, a safety relay actuated when the chuck is engaged with the stud and the stud is welded to the workpiece, said safety relay having normally open contacts to prevent resetting of said time delay means and re-energization of said control means when the chuck is still in contact with the stud and the stud is welded to the workpiece.

6. Welding apparatus for welding a stud to a workpiece comprising a chuck for engaging a stud, means for supplying welding current to said chuck to the workpiece, lifting means for retracting the chuck from the workpiece, plunging means for moving the chuck toward the workpiece, control means for controlling the lifting means and the supply means to retract said chuck and the stud to strike an arc between the stud and the workpiece when said control means is energized, and to cause said chuck and the stud to plunge toward the workpiece and the arc to be extinguished when the control means is deactivated after a period of time, trigger means for operating said control means, safety relay means actuated when the chuck is engaged with the stud and the stud is welded to the workpiece to prevent re-energization of said control means when the trigger means is released, the chuck is still in contact with the stud, the stud is welded to the workpiece, and for a short period after the chuck is separated from the welded stud.

7. In welding apparatus for welding a stud to a workpiece, a chuck for engaging the stud, supply circuit means for connecting said chuck to a source of power and for connecting the workpiece to the source of power, lifting means for retracting said chuck from the workpiece, plunging means for moving said chuck toward the workpiece, control means for operating said lifting means and for closing said circuit means to retract said chuck from the workpiece and to establish an arc between the stud and the workpiece, and means for deactivating said lifting means and for opening said circuit after a predetermined period, the improvement comprising safety means operative when said chuck is in contact with the stud and the stud is welded to the workpiece, and means responsive to said safety means for automatically preventing more than one operation of said control means when said safety means is operative, and for a substantially constant, short period of time after said chuck is separated from welded studs.

8. In welding apparatus for welding a stud to a workpiece, a chuck for engaging the stud, supply circuit means for connecting said chuck to a source of power and for connecting the workpiece to the source of power, lifting means for retracting said chuck away from the workpiece, plunging means for moving said chuck toward the workpiece, control means for operating said lifting means and for closing said circuit means to retract said chuck from the workpiece and to establish an arc between the stud and the workpiece, and means for deactivating said lifting means and for opening said circuit after a predetermined period, the improvement comprising safety means operative when the stud is welded to the workpiece, and means responsive to said safety means for automatically limiting the control means to one operation when said safety means is operative and for a substantially constant, short period of time after said chuck is separated from a welded stud.

References Cited

UNITED STATES PATENTS

| 2,287,818 | 6/1942 | Nelson | 219—98 |
| 2,779,859 | 1/1957 | Shoup et al. | 219—98 |

RICHARD M. WOOD, *Primary Examiner.*

R. F. STAUBLY, *Assistant Examiner.*